United States Patent [19]

Nordin

[11] 4,288,104
[45] Sep. 8, 1981

[54] PIPE SECTION, PREFERABLY A CONCRETE PIPE SECTION

[75] Inventor: Olof Nordin, Värnamo, Sweden

[73] Assignee: Forsheda Gummifabrik AB, Forsheda, Sweden

[21] Appl. No.: 72,574

[22] Filed: Sep. 5, 1979

[30] Foreign Application Priority Data

Sep. 8, 1978 [SE] Sweden .............................. 7809451

[51] Int. Cl.³ .............................................. F16L 55/00
[52] U.S. Cl. ....................................... 285/45; 285/291
[58] Field of Search ................... 285/230, 21, 231, 22, 285/45, 23, 291, 379, 374; 277/DIG. 4, 207 A

[56] References Cited

U.S. PATENT DOCUMENTS

| | | | |
|---|---|---|---|
| 2,368,610 | 1/1945 | Fischer | 277/207 A |
| 2,770,476 | 11/1956 | Cleverly | 285/291 X |
| 3,334,925 | 8/1967 | Jayne | 285/22 |
| 3,866,925 | 2/1975 | Maimstrom et al. | 285/230 |
| 3,915,460 | 10/1975 | Kramer | 277/DIG. 2 |
| 4,022,205 | 5/1977 | Tenczar | 285/21 X |

FOREIGN PATENT DOCUMENTS 564484  7/1960  Belgium .............................. 285/230

Primary Examiner—Dave W. Arola
Attorney, Agent, or Firm—Albert L. Jeffers

[57] ABSTRACT

The invention relates to a pipe section of the type which is manufactured by means of molding and which is provided with sealing surfaces for sealingly connecting the pipe with another pipe section. An annular sealing ring is connected to the pipe near one end thereof having an inwardly projecting portion and a further portion located axially inward of the first mentioned portion relative to the end of the pipe. The sealing ring has an inwardly facing pocket and a protector for the surfaces thereof comprising an annular element in contact with the pipe which is easily removable from the pipe at the place where the pipe is to be used. The pipe is molded against the annular element during manufacturing thereof.

5 Claims, 2 Drawing Figures

PIPE SECTION, PREFERABLY A CONCRETE PIPE SECTION

The present invention relates to a pipe section of the type which is manufactured by means of moulding and which is provided with sealing surfaces for sealingly connecting the pipe with another pipe section.

The joint between pipes which are connected with each other is usually sealed by means of sealing rings consisting of rubber or another elastic material. The pipes have specially designed surfaces which cooperate with the sealing rings in order to provide a sealed pipe joint. Thereby, it represents a problem that the sealing ring surfaces are during transportation and outdoor storage subjected to soiling and icing which without cleaning of the sealing ring surfaces before the jointing of the pipes make the jointing difficult or even impossible to perform or make the joint leaky.

It is possible to provide the sealing surfaces of the pipes with some kind of protective elements before the pipes leave the factory but the costs therefor are relatively high when using the presently known techniques. Such protective elements must closely connect with the sealing ring surface if it shall be possible to obviate the problem of for example icing. Previously known protective elements for the sealing surfaces which have the required tolerances in order to provide a close connection with the sealing surfaces and at the same time offer a simple mounting command high prices. For example concrete pipes have relatively wide manufacturing tolerances which makes the problem even more difficult to solve at acceptable costs. Thus, the object of the present invention is to provide a pipe section which obviate or mitigate the above drawbacks.

In order to comply with said object the pipe section according to the present invention comprises as a protection for at least one sealing ring surface an annular element being used at the moulding of the pipe as a mould portion and being easily removable from the pipe at the place where the pipe is to be used.

Thereby, it is preferred that the annular protective element consists of cellular plastic, preferably styrene cellular plastic.

It is also preferred that the annular protective element is connected with a sealing ring being partly embedded in the pipe section material.

In the following the invention is described, by way of example only, with reference to the accompanying drawing.

Figure 1:
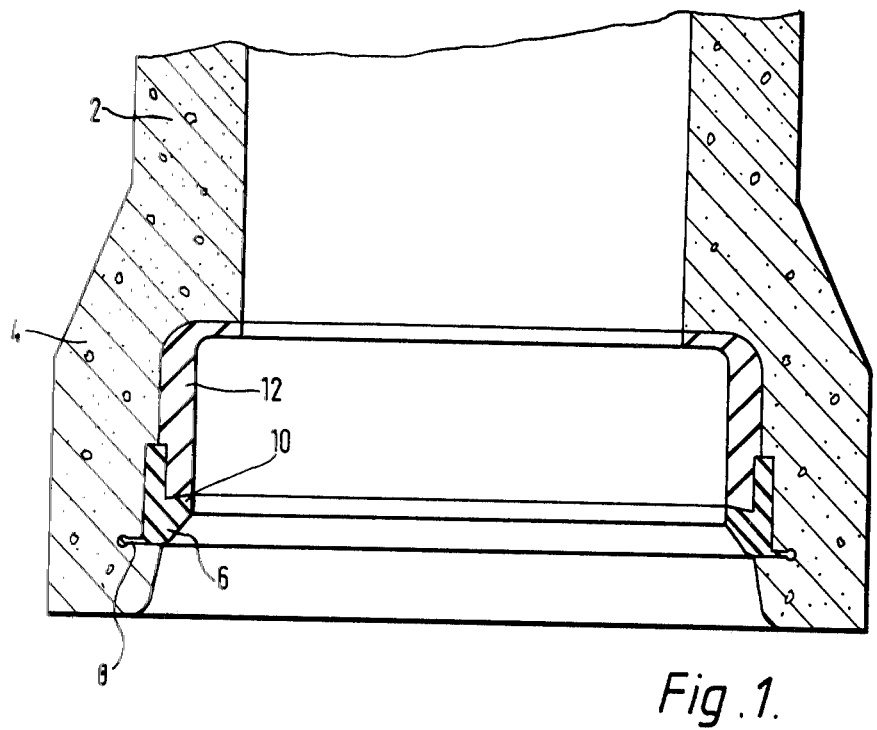
FIG. 1 is an axial section of a portion of a pipe section according to the invention.

In FIG. 1 there is shown an end portion of a pipe section 2, being constituted by a socket portion 4 of a concrete pipe 2. The socket portion 4 of the pipe section 2 is provided at its inner surface with a sealing ring 6 consisting of rubber or another elastic material. The sealing ring 6 is provided with a connector portion 8 which is partly embedded in the pipe material and a radially inwardly projecting sealing portion 10 which forms an axially inwardly facing pocket.

Axially inside the sealing ring 6 the socket portion 4 of the pipe section 2 has a protective element 12 which closely connects with the surface portion of the sealing ring 6 being positioned axially inside the projecting sealing portion 10 thereof as well as with the surface of the socket portion 4 of the pipe section 2 being positioned axially inside the sealing ring 6. The sleeve 12 is adapted to constitute a protection for the surfaces of the sealing ring and the socket of the pipe which are covered by the sleeve during storage and transportation of the pipe 2. When transporting and storing a conventional pipe without a sleeve 12 according to the invention said surfaces are often soiled and iced. Such soiling and icing require a cleaning of the pipe before the pipe is jointed with another pipe. If no such cleaning is performed it will be difficult or impossible to joint the pipes and besides the imperviousness of the joint can be jeopardized.

It is recognized that the sleeve 12 shall be connected with the pipe until the pipe is jointed with another pipe by introducing the spigot end thereof in the socket portion 4. In order to provide that the sleeve 12 is securely retained in the pipe during transportation and storage but in spite thereof is easily removable when the pipe is to be jointed with an other pipe the sleeve has to consist of a rigid but easily breakable and removable material. A material having these characteristics is constituted by such a styrene cellular plastic which is manufactured by moulding expanded granules in closed moulds wherein the material by being treated with steam sinters together to a unitary cellular mass. A protective sleeve 12 of such a material closely connects with the surfaces of the sealing ring 6 and the socket portion 4, constitutes a rigid and securely retained element during transportation and storage of the pipe and can be easily broken away therefrom, when the pipe is to be used.

In order further to facilitate the removal of the sleeve 12 it is possible to use a tearing strip or the like which is positioned between the sleeve and the concrete surface around the whole periphery of the sleeve and has an end portion extending inwardly therefrom in order to form an end which can be gripped for making it possible to tear off the whole sleeve.

Figure 2:
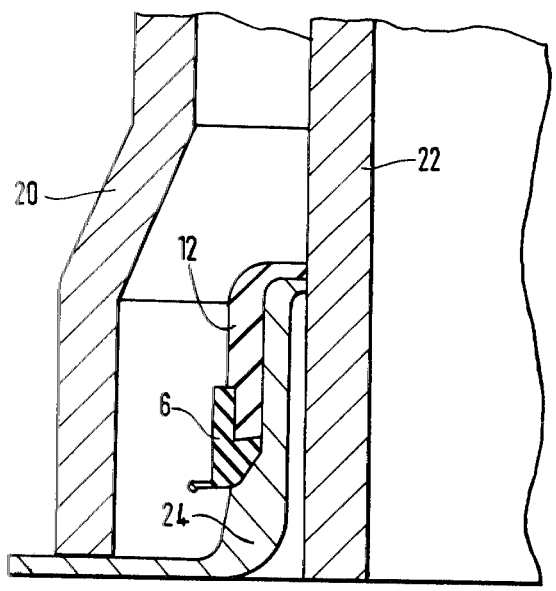
FIG. 2 illustrates a method of moulding a pipe section of the type shown in FIG. 1.

In FIG. 2 there is shown how the sleeve 12 preferably can be positioned in the pipe at the moulding thereof. The concrete pipe is manufactured by means of a mould which in a conventional way consists of two concentric mould portions 20 and 22 for constituting the outer and inner surfaces of the pipe wall and a mould or bottom ring 24 for forming the inner surface of the socket portion of the pipe and the end portion of said socket portion. Before the concrete is filled into the mould there is positioned against the bottom ring 24 a sleeve 12 of for example styrene cellular plastic as well as a sealing ring 6 of rubber or another elastic material. When the concrete is filled into the mould the connector portion 8 projecting from the sealing ring 6 is firmly embedded in the concrete while the rest of the sealing ring 6 and the sleeve 12 form the main portion of the inner surface of the socket portion 4 of the pipe. When the concrete has hardened the concrete pipe is removed from the mould portions 20, 22 and 24 with the sealing ring 6 and the protective sleeve 12 being left in the socket portion 4 of the pipe.

As appears from the above description there has according to the invention been manufactured in a simple way a socket concrete pipe having a sealing ring mounted in the pipe and adapted to cooperate with a spigot end introduced into the socket portion when the pipe is jointed and in addition thereto has a protective sleeve which during transportation and storage of the pipe constitutes an effective but in spite thereof easily removable protection for the sensitive sealing sealing surfaces of the pipe. It has also been recognized that styrene cellular plastic is a material which has unexpectedly favourable qualities as a mould surface when moulding concrete. Thus, the styrene cellular plastic constitutes a totally water repellent surface in spite of the fact that the styrene cellular plastic is slightly pervious to air so that the formation of voids at the concrete surface is quite obviated.

In spite of the fact that the styrene cellular plastic is preferred for forming the protective sleeve because of its favourable characteristics it is of course also possible to use according to the invention other materials for forming the sleeve 12 without departing from the inventive scope. Such other materials are other plastic materials, different types of fibre materials and the like.

I claim:

1. In combination, a pipe of the type which is manufactured by moulding the pipe and material in a mould, an annular sealing ring connected to said pipe near one end thereof and adapted for sealingly connecting said pipe to another pipe, said sealing ring including ring an annular inwardly projecting sealing portion and a further portion located axially inward of said sealing portion relative to the end of said pipe, said sealing portion and said further portion having surfaces forming an axially inwardly facing pocket, and a protector for said surfaces of said sealing ring portions comprising an annular element in contact with said pipe and said surfaces of said sealing ring portions, said annular element being easily removable from said pipe at the place where said pipe is to be used, said pipe being moulded against said annular element.

2. A pipe as claimed in claim 1 wherein said annular ring is embedded in said pipe.

3. A pipe as claimed in claim 1 or 2, wherein the annular protective element consists of cellular plastic, preferably styrene cellular plastic.

4. A pipe as claimed in claim 3, wherein the styrene cellular plastic is of the type manufactured by sintering expanded granules together.

5. A pipe as claimed in claim 1 comprising a tearing strip positioned between the annular protective element and the opposite surface of the pipe for facilitating the removal of the protective element.

* * * * *

UNITED STATES PATENT AND TRADEMARK OFFICE
CERTIFICATE OF CORRECTION

PATENT NO. : 4,288,104
DATED : September 8, 1981
INVENTOR(S) : Olof Nordin

It is certified that error appears in the above—identified patent and that said Letters Patent is hereby corrected as shown below:

Col. 3, line 1, "sealing" (second occurrence) should be ---ring---.

Col. 3, claim 1, line 5, "ring" should be deleted. (second occurrence).

Signed and Sealed this

Eighth Day of December 1981

[SEAL]

Attest:

Attesting Officer

GERALD J. MOSSINGHOFF
*Commissioner of Patents and Trademarks*